United States Patent
Brodie et al.

(10) Patent No.: US 9,630,474 B2
(45) Date of Patent: Apr. 25, 2017

(54) THERMOSTATIC CONTROLLED HEAT PUMP WATER CIRCUIT

(71) Applicant: DENSO International America, Inc., Southfield, MI (US)

(72) Inventors: Bradley Brodie, Milford, MI (US); Erik Huyghe, Rochester Hills, MI (US); Lisa Florida, Ann Arbor, MI (US); Mark Kastner, Livonia, MI (US)

(73) Assignee: Denso International America, Inc., Southfield, MI (US)

( * ) Notice: Subject to any disclaimer, the term of this patent is extended or adjusted under 35 U.S.C. 154(b) by 633 days.

(21) Appl. No.: 14/065,964

(22) Filed: Oct. 29, 2013

(65) Prior Publication Data

US 2015/0115048 A1  Apr. 30, 2015

(51) Int. Cl.
| | | |
|---|---|---|
| *B60H 1/03* | (2006.01) | |
| *B60H 1/00* | (2006.01) | |
| *B60H 1/08* | (2006.01) | |
| *F25B 27/02* | (2006.01) | |
| *F24H 4/02* | (2006.01) | |

(52) U.S. Cl.
CPC ..... *B60H 1/00899* (2013.01); *B60H 1/00764* (2013.01); *B60H 1/00807* (2013.01); *B60H 1/00921* (2013.01); *B60H 1/03* (2013.01); *B60H 2001/00928* (2013.01)

(58) Field of Classification Search
CPC ............ B60H 1/00899; B60H 1/00807; B60H 1/00921; B60H 1/03; B60H 1/08; B60H 2001/00928; B63J 2002/125; B64D 13/08; B64D 2013/064; B64D 33/10; F25B 6/02; F25B 27/02; F24H 4/02
USPC .............. 237/2 B, 12.3 B, 8 A, 8 C; 60/515; 236/22, 38; 123/142.5 R
IPC .... B60H 1/03, 1/08; B63J 2/12; B64D 13/08, 33/10; F25B 6/02, 27/02; F24H 04/02
See application file for complete search history.

(56) References Cited

U.S. PATENT DOCUMENTS

| | | | |
|---|---|---|---|
| 4,621,594 A | | 11/1986 | Kubis |
| 5,249,742 A | * | 10/1993 | Atterbury ............... F24D 15/04 237/12.3 B |
| 5,967,101 A | | 10/1999 | Roth et al. |
| 6,913,067 B2 | * | 7/2005 | Hesse ..................... B60H 1/08 165/202 |
| 6,920,922 B2 | * | 7/2005 | Takeuchi ........... B60H 1/00921 165/202 |

(Continued)

FOREIGN PATENT DOCUMENTS

| | | | |
|---|---|---|---|
| DE | 3105373 A1 * | 11/1982 | .......... F24D 11/0214 |
| DE | 10141389 A1 | 3/2003 | |

OTHER PUBLICATIONS

Office Action dated May 12, 2016 issued in the corresponding DE application No. 102014115530.0 in German with English translation.

*Primary Examiner* — Gregory Huson
*Assistant Examiner* — Daniel E Namay
(74) *Attorney, Agent, or Firm* — Harness, Dickey & Pierce, P.L.C.

(57) ABSTRACT

A method for regulating coolant temperature of an HVAC heat pump system with coolant heating. The method includes measuring temperature of coolant flowing through the system, and configuring a valve assembly of the system to direct coolant flow to a heater core from both an engine and an engine bypass line when temperature of the coolant is above a predetermined threshold.

13 Claims, 10 Drawing Sheets

(56) References Cited

U.S. PATENT DOCUMENTS

| | | | |
|---|---|---|---|
| 6,935,421 B2* | 8/2005 | Takeuchi | B60H 1/323 165/202 |
| 7,048,044 B2* | 5/2006 | Ban | B60H 1/00314 165/202 |
| 7,063,137 B2* | 6/2006 | Kadle | B60H 1/00878 165/202 |
| 7,096,831 B2 | 8/2006 | Finkbeiner et al. | |
| 7,140,427 B2* | 11/2006 | Honda | B60H 1/00907 165/202 |
| 7,690,213 B2* | 4/2010 | Inaba | B60H 1/00885 62/238.6 |
| 8,245,948 B2* | 8/2012 | Cho | F25B 27/02 122/1 R |
| 8,607,855 B2* | 12/2013 | Feuerecker | B60H 1/00907 165/202 |
| 8,807,445 B2* | 8/2014 | Ribadeneira | B60H 1/004 237/2 B |
| 2001/0020529 A1* | 9/2001 | Karl | B60H 1/00007 165/202 |
| 2001/0035286 A1* | 11/2001 | Kobayashi | B60H 1/3207 165/202 |
| 2003/0046945 A1 | 3/2003 | Heyl et al. | |
| 2003/0079873 A1* | 5/2003 | Kuroda | B60H 1/00735 165/202 |
| 2003/0089493 A1* | 5/2003 | Takano | B60H 1/00914 165/202 |
| 2003/0102119 A1* | 6/2003 | Takano | B60H 1/00735 165/202 |
| 2007/0214817 A1* | 9/2007 | Inaba | B60H 1/00885 62/238.6 |
| 2009/0205353 A1* | 8/2009 | Takahashi | B60H 1/00899 62/324.1 |
| 2010/0000713 A1* | 1/2010 | Takahashi | B60H 1/00899 165/61 |
| 2014/0013785 A1* | 1/2014 | Takemoto | F01K 13/02 62/238.7 |
| 2014/0318170 A1* | 10/2014 | Katoh | F28F 9/26 62/324.5 |
| 2014/0345312 A1* | 11/2014 | Katoh | B60H 1/00342 62/277 |
| 2015/0115048 A1* | 4/2015 | Brodie | B60H 1/00764 237/2 B |
| 2015/0273976 A1* | 10/2015 | Enomoto | B60K 6/22 165/202 |

* cited by examiner

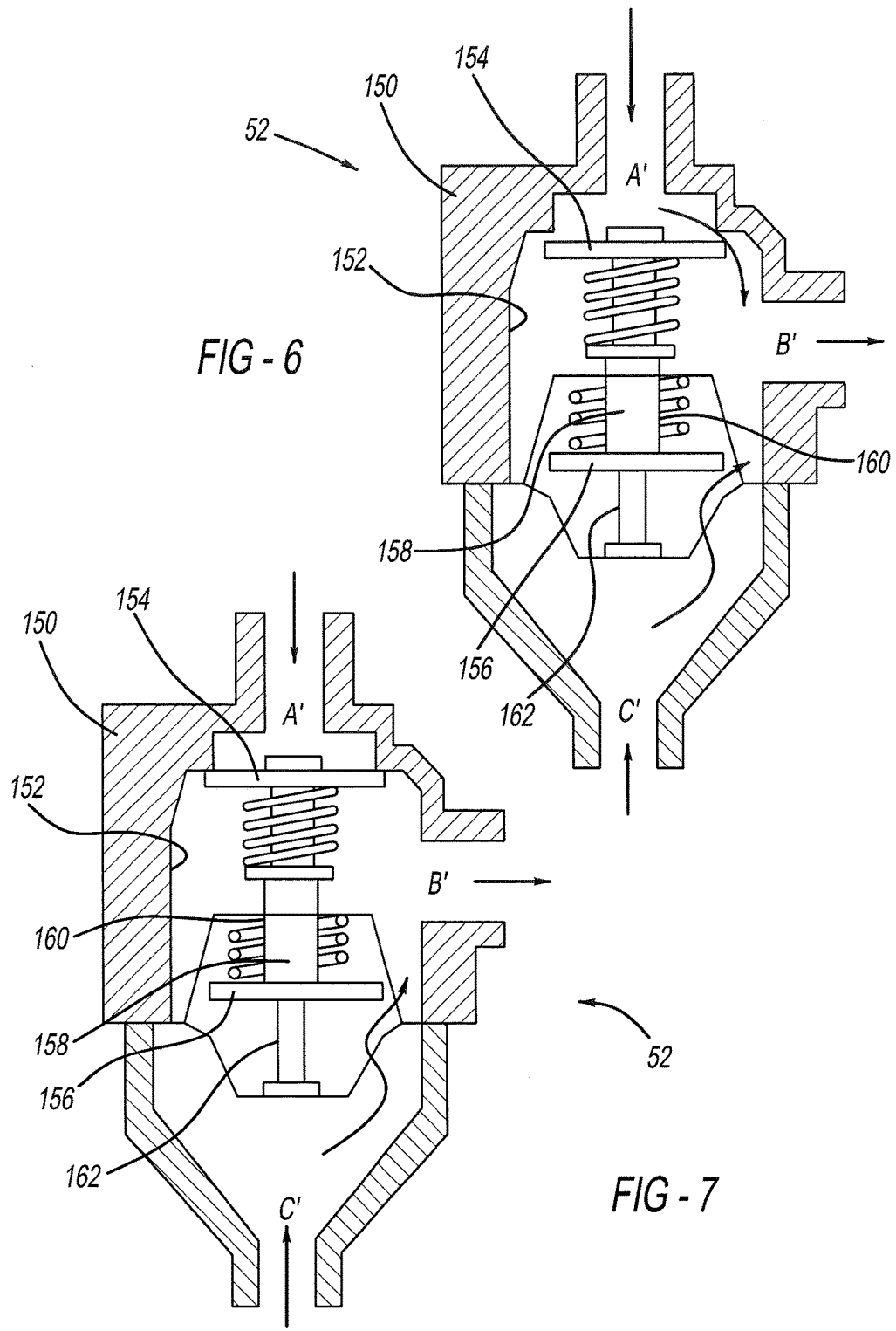

THERMOSTATIC CONTROLLED HEAT PUMP WATER CIRCUIT

FIELD

The present disclosure relates to a thermostatic controlled heat pump water circuit.

BACKGROUND

This section provides background information related to the present disclosure, which is not necessarily prior art.

Heat pumps can be useful in a variety of applications. For example, heat pumps can be used in plug-in hybrid electric vehicles (PHEV) and electric vehicles (EV) for heating the vehicle cabin. Heat pumps are particularly useful because they are more efficient than other heating systems, assemblies, and devices, such as electric heaters. Energy saved with a heat pump can be used to extend the driving range of the vehicle using the onboard battery in electric mode.

In PHEV applications that include an engine, it can be desirable to have the option of using either heat from the heat pump or heat from the engine when the engine is running in order to heat the cabin. To provide this option, a water or coolant circuit for heating the cabin with a heater core can be used. In a coolant circuit, hot coolant from the engine is used to heat the heater core when the engine is running. When the engine is not running, the coolant is heated by an electric heater or a heat pump system.

When using an electric heater, the heater can be switched on or off to regulate the temperature of coolant flowing to the heater core. The target coolant temperature is typically about 80° C. This is true in cold conditions where maximum heating is called for, as well as in mild conditions in which warm coolant is needed to re-heat the HVAC to provide occupants with a comfortable air temperature.

When the heat pump is in full heating mode, compressor speed can be adjusted to maintain the coolant at a temperature of about 80° C. However, in cooling mode, particularly in a closed loop cooling mode in which coolant does not pass through the engine, refrigerant exiting the compressor can be as high as 130° C., which can damage components of the water circuit. In an HVAC system in which heat is generated by an electric heater, the electric heater can simply be turned off to let the coolant temperature cool if it gets too hot.

But with a heat pump, if the compressor speed is reduced to prevent the coolant from becoming too warm, air conditioning performance may suffer and the temperature of the vehicle cabin may become undesirably warm. If cooler coolant from the engine is allowed to flow into the heat pump to cool coolant in the heat pump, temperature change experienced in the condenser may be too drastic and may undesirably affect the refrigerant cycle. For example, refrigerant may start to condense in the condenser, which happens in heating mode, thus adding liquid refrigerant to the condenser. The line extending between the water-cooled condenser and an outside heat exchanger, as well as the entire outside heat exchanger, may be undesirably filled with liquid refrigerant, which can result in a lack of refrigerant in the rest of the system for refrigerant starvation in the rest of the system).

A system for regulating coolant temperature of a heat pump system in cooling mode to allow for optimal operation of the heat pump, and to reduce or eliminate condenser condensation, would thus be desirable.

SUMMARY

This section provides a general summary of the disclosure, and is not a comprehensive disclosure of its full scope or all of its features.

The present teachings provide for a method for regulating coolant temperature of an HVAC heat pump system with coolant heating. The method includes increasing coolant flow from an engine to a heater core and decreasing coolant flow through an engine bypass line of the system if temperature of coolant exiting a condenser associated with the system is above a first predetermined threshold; increasing coolant flow from the engine to the heater core and decreasing coolant flow through the engine bypass line if temperature of coolant exiting the engine is greater than temperature of coolant exiting the heater core; and decreasing coolant flow from the engine to the heater core and increasing coolant flow through the engine bypass line if temperature of coolant exiting the condenser is below a second predetermined threshold.

The present teachings further provide for a method for regulating coolant temperature of an HVAC heat pump system with coolant heating. The method includes measuring temperature of coolant flowing through the system, and configuring a valve assembly of the system to direct coolant flow to a heater core from both an engine and an engine bypass line when temperature of the coolant is above a predetermined threshold.

The present teachings also provide for a method for regulating coolant temperature of an HVAC heat pump system with coolant heating. The method includes measuring temperature of coolant exiting an engine and measuring temperature of coolant exiting a heater core, and comparing temperature of the coolant exiting the engine with temperature of the coolant exiting the heater core. If the temperature of the coolant exiting the engine is greater than the temperature of the coolant exiting the heater core, applying power to a valve of the system to configure the valve to direct coolant from the engine to the heater core and restrict coolant flow to the heater core through an engine bypass line.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 illustrates the valve assembly of FIG. 5 in a second operating configuration;

FIG. 7 illustrates the valve assembly of FIG. 5 in a third operating configuration;

Corresponding reference numerals indicate corresponding parts throughout the several views of the drawings.

DETAILED DESCRIPTION

Example embodiments will now be described more fully with reference to the accompanying drawings.

Figure 1:
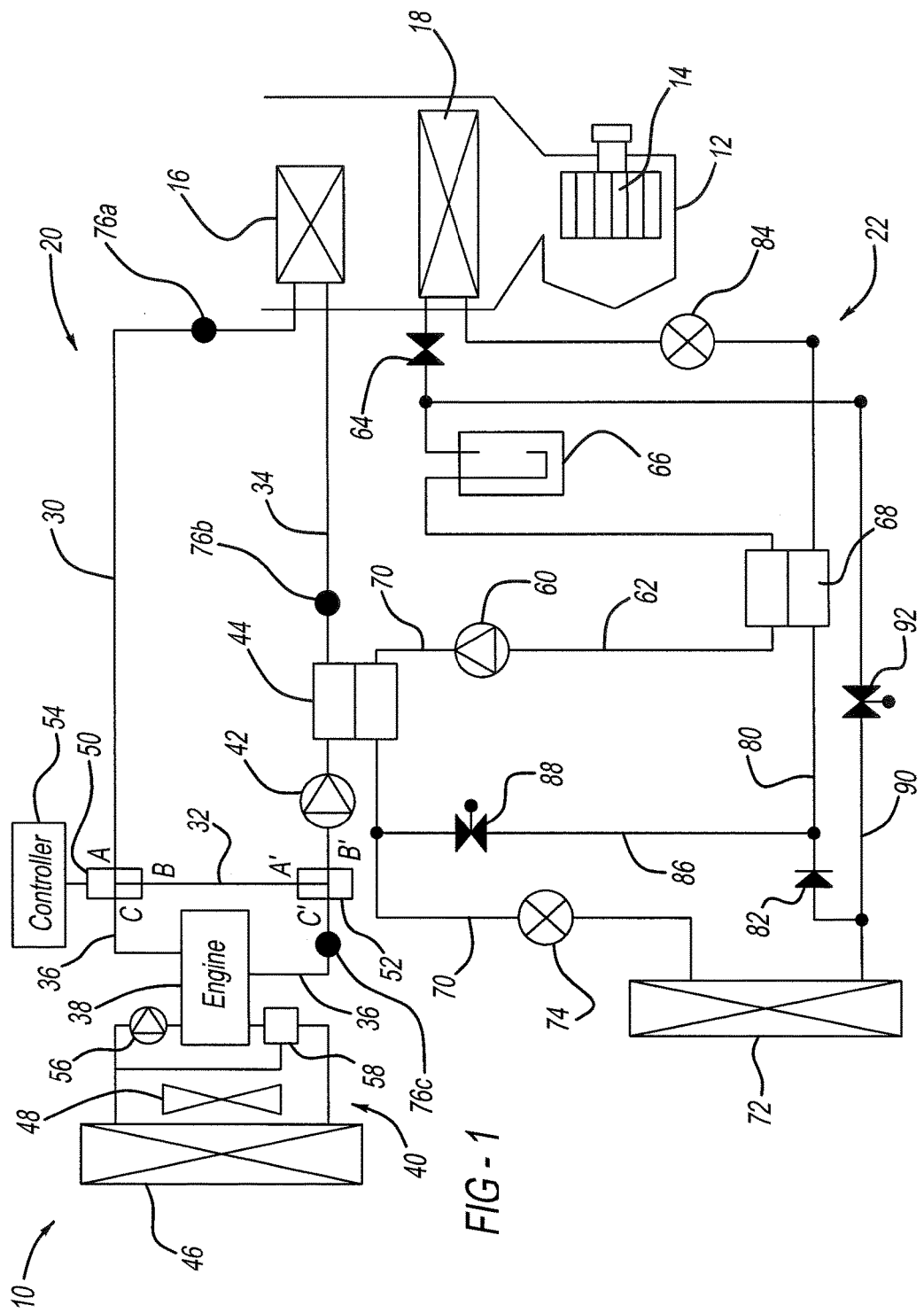
FIG. 1 is a schematic view of a heating, ventilation, and air conditioning (HVAC) assembly or system according to the present teachings.

With initial reference to FIG. 1, a heating, ventilation, and air conditioning (HVAC) assembly or system according to the present teachings is generally illustrated at reference numeral 10. Although the HVAC system 10 is generally described herein as an HVAC system for a motor vehicle, such as an automobile, the HVAC system 10 can be suitable for use in a variety of applications. For example, the HVAC system 10 can be used with a heavy duty vehicle or tank, a military vehicle, a water vessel, an aircraft, or a building, for example.

The HVAC system 10 generally includes an HVAC unit 12 having at least a blower 14, a heater core 16, and an evaporator 18. The blower 14 is configured to blow air across each of the heater core 16 and the evaporator 18 in order to heat or to cool a desired area, such as a passenger cabin of a vehicle. The heater core 16 is generally in fluid cooperation with an engine coolant system 20. The coolant system 20 is configured to circulate a suitable coolant through the heater core 16. The coolant can include any suitable heat transfer fluid, such as water, propylene glycol, and/or ethylene glycol. The coolant can include any suitable mixture of heat transfer fluid, such as a 50/50 water/propylene glycol mixture or a 50/50 water/ethylene glycol mixture. The evaporator 18 is generally in fluid communication with a heat pump refrigerant loop 22, which is suitable for circulating any suitable refrigerant through the evaporator 18. The coolant system 20 and the refrigerant loop 22 will now be described in detail, starting generally with the coolant system 20.

The coolant system 20 includes a heater core output line 30, which is any suitable conduit configured to transport coolant exiting the heater core 16 away from the heater core 16. The heater core output line 30 can be any suitable conduit line, such as a hose or pipe. The heater core output line 30 extends away from the heater core 16 first to an engine bypass line 32. The engine bypass line 32 extends from a heater core output line 30 to a heater core return line 34. The heater core return line 34 generally extends from the engine bypass line 32 back to the heater core 16. Along the heater core return line 34 is a pump 42 and a water-cooled condenser 44, which are described herein. Like the heater core output line 30, the engine bypass line 32 and the heater core return line 34 can each be any suitable conduit configured to convey coolant therethrough, such as a pipe or hose.

Figure 2:
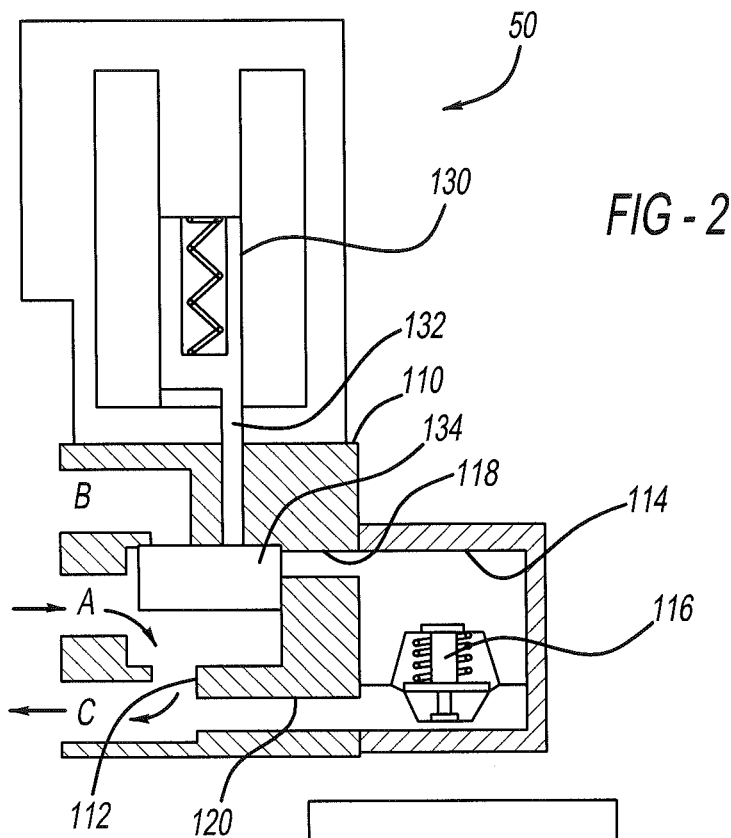
FIG. 2 illustrates a valve assembly of the HVAC assembly of FIG. 1 in a first operating configuration.
Figure 3:
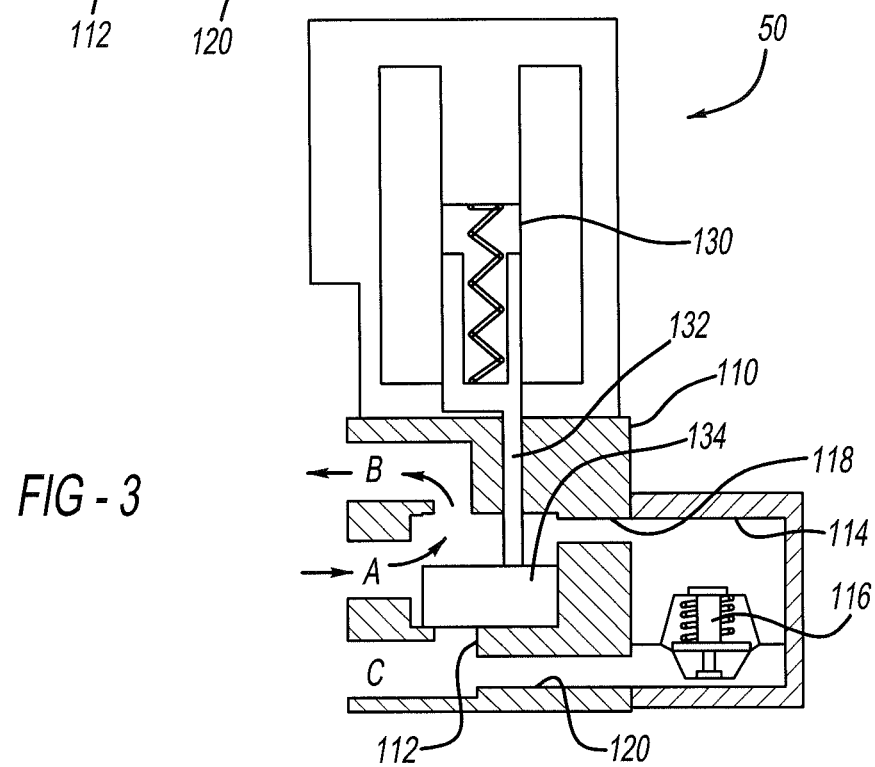
FIG. 3 illustrates the valve assembly of FIG. 2 in a second operating configuration.
Figures 4, 5:
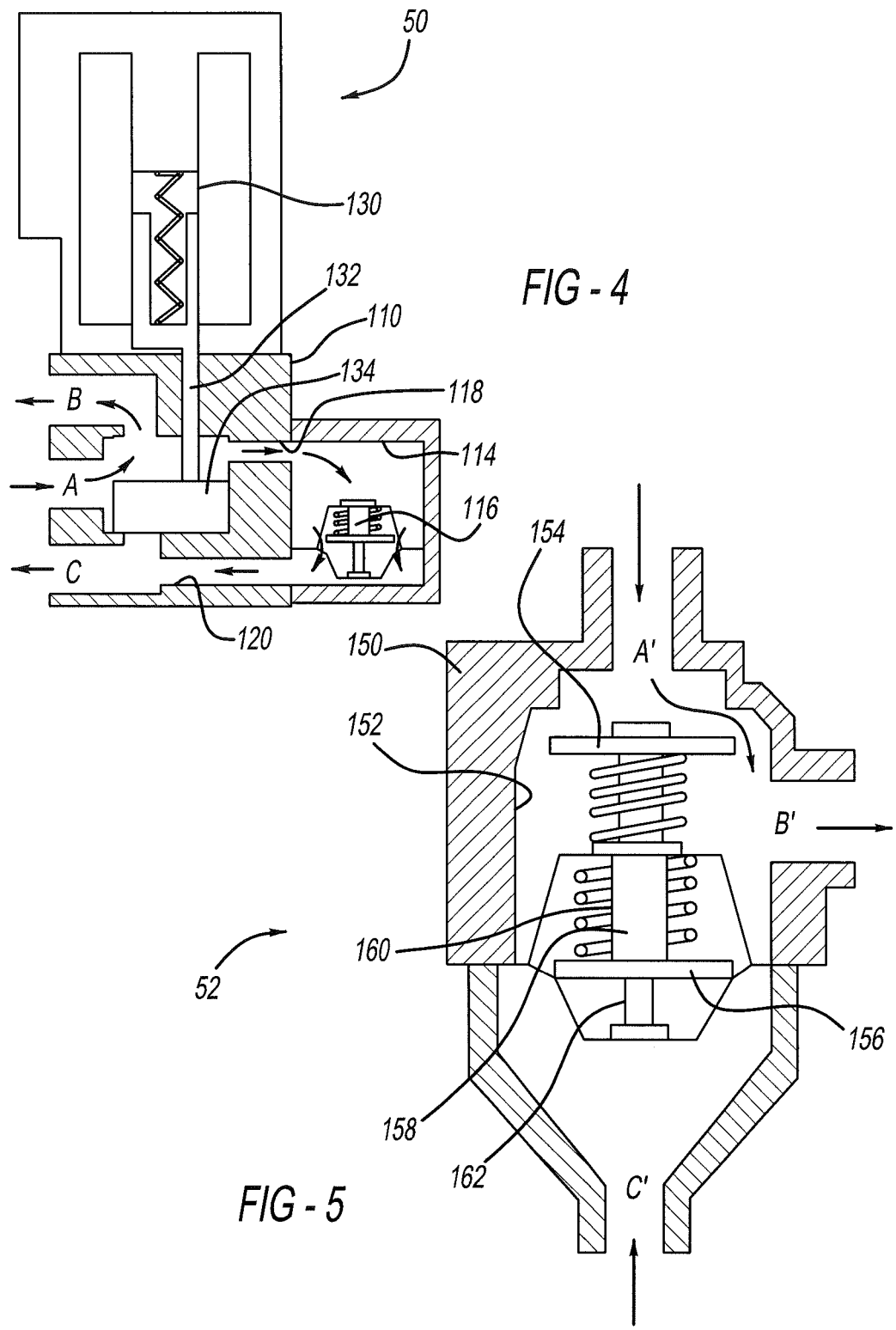
FIG. 4 illustrates the valve assembly of FIG. 2 in a third operating configuration.
FIG. 5 illustrates another valve assembly for use with the HVAC assembly of FIG. 1, the valve assembly is illustrated in a first operating configuration.

An engine line 36 generally extends from a junction between the heater core output line 30 and the engine bypass line 32. At the junction between the heater core output line 30, the engine bypass line 32, and the engine line 36 can be a first valve assembly 50, which is described in detail herein and is illustrated in FIGS. 2-4 for example. The engine line 36 is any suitable conduit operable to convey coolant to and away from an engine 38. For example, the engine line 36 can be any suitable hose or pipe. The engine 38 can be any suitable engine, such as a vehicle internal combustion engine. From the engine 38 the engine line 36 extends generally to a junction between the engine bypass line 32 and the heater core return line 34. At the junction between the engine bypass line 32, the heater core return line 34, and the engine line 36 can be a second valve assembly 52, which can be included in place of the first valve assembly 50. The second valve assembly 52 is described in detail below and is illustrated in FIGS. 5-7 for example.

An engine cooling loop is generally illustrated at reference numeral 40 of FIG. 1. The engine cooling loop 40 generally includes a radiator 46, a radiator fan 48, a pump 56, and an engine thermostat 58. The engine thermostat 58, the radiator 46, and the fan 48 regulate temperature of the engine 38. Temperature of the engine 38 is regulated such that it does not exceed a predetermined level, such as 80° C. or about 80° C.

Along the heater core return line 34 is the pump 42 and the condenser 44, such as a water-cooled condenser. The pump 42 is configured to circulate coolant through the coolant system 20. The condenser 44 is configured to radiate heat from compressed refrigerant flowing through the refrigerant loop 22, in order to heat coolant being pumped through the coolant system 20 by the pump 42.

Temperature of the coolant throughout the coolant system 20 can be monitored in any suitable manner, such as with temperature sensors. For example, a heater core coolant out temperature sensor 76a can be arranged along the heater core output line 30 proximate to the heater core 16. A water cooled condenser coolant out temperature sensor 76b can be arranged along the heater core return line 34 between the condenser 44 and the heater core 16. The water cooled condenser coolant out temperature sensor 76b is optional, such as with respect to method 250 of FIG. 9 described herein. An engine coolant out temperature sensor 76c can be arranged along the engine line 36 proximate to the second inlet C' of the second valve assembly 52 (or proximate to outlet/inlet C of the first valve assembly 50 if provided where the second valve assembly 52 is illustrated in FIG. 1). One or more of the sensors 76a, 76b, and 76c are optional because the values measured by the sensors 76a, 76b, and 76c can be estimated based on other values. For example, coolant temperature measured by the heater core coolant out temperature sensor 76a can be estimated based on the temperature of air output by the heater core 16. Each of the sensors 76a, 76b, and 76c can be in communication with a suitable controller, such as controller 54, which can monitor coolant temperature to control operation of the engine coolant system 20, such as described herein with respect to the methods of FIGS. 8 and 9.

The coolant system 20 includes either the first valve assembly 50 or the second valve assembly 52 in place of the first valve assembly. The first valve assembly 50 is generally located where the heater core output line 30 interfaces with the engine bypass line 32 and the engine line 36. As generally described herein, the first valve assembly 50 generally includes an input A, a first output B, and a second output C. The heater core output line 30 connects to the first valve assembly 50 at the input A and directs coolant passing through the heater core output line 30 into the first valve assembly 50 at the input A. The engine bypass line 32 connects to the first valve assembly 50 at the first output B. Thus from the first output B coolant flows into the engine bypass line 32. The engine line 36 is connected to the first valve assembly 50 at the second output C. Thus from the second output C coolant flows into the engine line 36. As explained in further detail herein, the first valve assembly 50 is configured to selectively direct coolant entering through the inlet A as follows: entirely out through the first outlet B to the engine bypass line 32; entirely out through the second outlet C to the engine 38 by way of the engine line 36; or out through each of the first outlet B and the second outlet C in a particular proportion based on temperature of the coolant.

The first valve assembly 50 is optional, and may be replaced with the second valve assembly 52. The second valve assembly 52 includes a first inlet A', an outlet B', and a second inlet C'. The engine bypass line 32 is connected to the first inlet A' to direct coolant flowing through the engine bypass line 32 to the heater core return line 34, and back to the heater core 16. The engine line 36 is connected to the second inlet C'. Coolant entering through the inlet C' by way of the engine line 36 can be directed to the heater core return line 34 through the outlet B', and ultimately to the condenser 44 and the heater core 16.

The first valve assembly 50 can be located as illustrated in FIG. 1, or can be located where the second valve assembly 52 is located. Similarly, the second valve assembly 52 can be located as illustrated in FIG. 1, or can be located where the first valve assembly 50 is illustrated. While coolant flow is generally described herein as flowing in a counter-clockwise direction through the engine coolant system 20 as illustrated in FIG. 1, coolant flow can optionally be reversed and thus be provided in a clockwise direction.

The first and second valve assemblies 50 and 52 can each be any suitable valve assembly for directing coolant flow selectively therethrough. For example, the first valve assembly 50 can be a magnetic valve assembly and the second valve assembly 52 can be a double poppet thermostat valve assembly. The first and second valve assemblies 50 and 52 can be controlled using any suitable device, such as a controller 54.

In applications where the first valve assembly 50 is present in place of the second valve assembly 52, at the location of the second valve assembly 52 illustrated in FIG. 1 will be a manifold configured to permit coolant flow from the engine bypass line 32 to the heater core return line 34, and from the engine line 36 to the heater core return line 34. In applications where the second valve assembly 52 is present in place of the first valve assembly 50, a manifold will be present at the location of the first valve assembly 50 illustrated in FIG. 1, in order to permit coolant flow from the heater core output line 30 to the engine bypass line 32 and the engine line 36.

Various aspects of the heat pump refrigerant loop 22 will now be described. The heat pump refrigerant loop 22 includes a compressor 60 configured to pump refrigerant through the refrigerant loop 22. The compressor 60 is in communication with the evaporator 18 through a compressor input line 62, which generally extends from the evaporator 18 to the compressor 60. Along the compressor input line 62 generally proximate to the evaporator 18 is an evaporator pressure regulator (EPR) 64. The EPR 64 is generally configured to maintain constant pressure of the refrigerant at the evaporator 18. The EPR 64 is between the evaporator 18 and an accumulator 66. The accumulator 66 isolates the compressor 60 from liquid refrigerant, which may negatively affect the compressor 60. The accumulator 66 also removes debris and moisture from the refrigerant loop 22. Between the accumulator 66 and the compressor 60 is an internal heat exchanger 68.

The refrigerant loop 22 further includes a compressor output line 70 extending from the compressor 60 to an outside heat exchanger 72. Along the compressor output line 70 between the compressor 60 and the outside heat exchanger 72 is the water-cooled condenser 44. Between the water-cooled condenser 44 and the outside heat exchanger 72 along the compressor output line 70 is an electric expansion valve 74 for heating.

Extending generally from the outside heat exchanger 72 to the evaporator 18 is a cooling line 80. The cooling line 80 can be any suitable conductor for conveying refrigerant from the outside heat exchanger 72 to the evaporator 18, such as a suitable pipe or hose. The cooling line 80 extends through the internal heat exchanger 68, and includes a check valve 82 between the outside heat exchanger 72 and the internal heat exchanger 68. Between the internal heat exchanger 68 and the evaporator 18 along the cooling line 80 is an electric expansion valve 84 for cooling.

The heat pump refrigerant loop 22 further includes a dehumidification line 86 extending between the compressor output line 70 and the cooling line 80. Along the dehumidification line 86 is a first refrigerant valve 88, which can be a high-pressure type magnetic valve. The dehumidification line 86 can be any suitable conduit configured to direct refrigerant between the compressor output line 70 and the cooling line 80, such as to provide high pressure refrigerant to the electric expansion valve 84 along with the electric expansion valve 74 in parallel dehumidification mode.

Extending from the cooling line 80 proximate to the outside heat exchanger 72 is a heating/parallel dehumidification/deicing line 90. The heating/parallel dehumidification/deicing line 90 branches off from the cooling line 80, or vice versa, and extends to the compressor input line 62 at a point between the EPR 64 and the accumulator 66. Along the heating/parallel dehumidification/deicing line 90 is a second refrigerant valve 92, which can be a high-pressure type magnetic valve.

With continued reference to FIG. 1 and additional reference to FIGS. 2-4, the first valve assembly 50 will be further described, as will operation of the coolant system 20 as outfitted with the first valve assembly 50. The first valve assembly 50 generally includes a housing 110 defining a main chamber 112 for directing fluid flow through the first valve assembly 50. The inlet A, the first outlet B, and the second outlet C are each defined within the main chamber 112. The housing 110 further defines a thermostat chamber 114. Seated within the thermostat chamber 114 is a thermostat valve 116, which is configured to open when exposed to coolant at or above a predetermined elevated temperature, such as above 80° C. for example. The housing 110 defines an inlet 118 extending between the main chamber 112 and the thermostat chamber 114. The housing 110 further defines an outlet 120 extending between the thermostat chamber 114 and the main chamber 112.

The first valve assembly 50 further includes an actuation member 130 having an actuation post 132 and a valve block 134 mounted thereto. Together the actuation member 130, the actuation post 132 and the valve block 134 generally provide a main valve of the first valve assembly 50. The actuation member 130 and the actuation post 132 are generally operable to move the valve block 134 from an at rest position illustrated in FIG. 3 to an actuated position illustrated in FIG. 2, for example. In the at rest position of FIG. 3, the valve block 134 blocks the second outlet C, and thus restricts coolant flow to the engine line 36 and the engine 38. With the thermostat valve 116 in the closed position of FIGS. 2 and 3, coolant is restricted from passing through the thermostat chamber 114 to the second outlet C.

When the valve block 134 is moved to the actuated position of FIG. 2, the valve block 134 blocks the outlet B, and thus restricts flow of coolant to the engine bypass line 32 from the heater core 16. In the actuated position, the valve block 134 permits flow of coolant through the second outlet C, and thus permits coolant to flow from the heater core 16 in through the inlet A, and through the outlet C to the engine line 36 and the engine 38. Coolant from the engine 38 can be used to heat the heater core 16, thus conserving energy in, for example, a PHEV vehicle.

With reference to FIG. 4, if coolant exiting the heater core 16 and entering the first valve assembly 50 through the inlet A is above a predetermined temperature, such as 80° C., the thermostat valve 116 will open in response to contact with coolant having such an elevated temperature. With the thermostat valve 116 in the open position of FIG. 4, coolant will flow through the inlet 118, into the thermostat chamber 114, past the thermostat valve 116, exit the thermostat chamber 114 through the outlet 120, and exit the first valve assembly 50 through the second outlet C, from which the coolant will flow to the engine line 36 and through the engine 38. Coolant will also exit the first valve assembly 50 through the first outlet B and flow through the engine bypass line 32. The thermostat valve 116 thus advantageously allows the first valve assembly 50 to direct coolant with an elevated temperature to the engine bypass line 32, the engine 38, and the radiator 46. As coolant with the elevated temperature passes through the engine 38 and the radiator 46, it will typically cool. Prior to reaching the water-cooled condenser 44, the cooled coolant will mix with the coolant flowing through the engine bypass line 32. As a result, when the coolant reaches the water-cooled condenser 44, the coolant will likely have cooled to an acceptable level, such as 80° C. or below, thus allowing the water-cooled condenser 44 to function optimally. Because the coolant is a mixture of coolant having passed through the engine 38 and coolant having passed through the engine bypass line 32, the coolant will not be so cool that the refrigerant cycle will be disrupted and refrigerant passing through the water-cooled condenser 44 will not condense to unacceptably high levels.

The second valve assembly 52, which can be used in place of the first valve assembly 50 as explained above, will now be described further. The second valve assembly 52 generally includes a housing 150, which defines a chamber 152. Within the chamber 152 is a first thermostat valve 154 and a second thermostat valve 156. The first thermostat valve 154 is movable between an open position, as illustrated in FIGS. 5 and 6, and a closed position, as illustrated in FIG. 7. In the open position, the first thermostat valve 154 does not obstruct coolant flow from passing through the first inlet A' and into the chamber 152. From the chamber 152, the coolant is free to exit the chamber 152 through the outlet B'. In the closed position of FIG. 7, the first thermostat valve 154 blocks the first inlet A', and thus prevents coolant flowing through the engine bypass line 32 from entering the chamber 152 through the first inlet A'.

The first thermostat valve 154 actuates in response to the temperature of coolant flowing through the engine bypass line 32. For example, if the coolant flowing through the engine bypass line 32 is below a predetermined threshold, such as 80° C., the first thermostat valve 154 will open to the position of FIGS. 5 and 6, thereby permitting coolant to flow through the chamber 152 as described above. If temperature of coolant flowing through the engine bypass line 32 is above a predetermined threshold, such as 80° C., the first thermostat valve 154 may close slightly or entirely, as illustrated in FIG. 7, to limit the amount of hot coolant directed to the water-cooled condenser 44 and the heater core 16.

In further response to the elevated temperature of the coolant above the predetermined threshold, the second thermostat valve 156 will open, thus allowing coolant from the engine 38 to enter the chamber 152 through the second inlet C' and mix with the coolant of the engine bypass line 32 entering through first inlet A'. Coolant exiting the chamber 152 through the outlet B' will thus be at or below the predetermined temperature of 80° C., and coolant flowing to the water-cooled condenser 44 will be at an acceptable level and will allow the water-cooled condenser 44 to function optimally. In response to varying temperatures of the coolant sensed by the thermostat, the valves 154 and 156 can open and close to mix coolant flowing therethrough to arrive at a suitable mixture having a temperature below a predetermined threshold, such as 80° C., which will permit the condenser 44 and the heater core 16 to operate optimally.

The second valve assembly 52 further includes a heating element 158. When the engine 38 is running, the controller 54 can activate the heating element 158 in order to heat wax present in a chamber 160 of the second valve assembly 52, which will push pin 162 out from within the chamber 160 and cause the second thermostat valve 156 to fully open, as illustrated in FIG. 7. This opening of the second thermostat valve 156 will push the first thermostat valve 154 into the fully closed position of FIG. 7 to prevent passage of coolant into the chamber 152 through the first inlet A'. Thus, in the configuration of FIG. 7, only coolant from the engine 38 is able to pass through the second valve assembly 52 and flow to the water-cooled condenser 44, and ultimately the heater core 16. This allows waste heat from the engine 38 to advantageously be directed to the heater core 16 in order to heat, for example, a passenger cabin.

Figure 8:
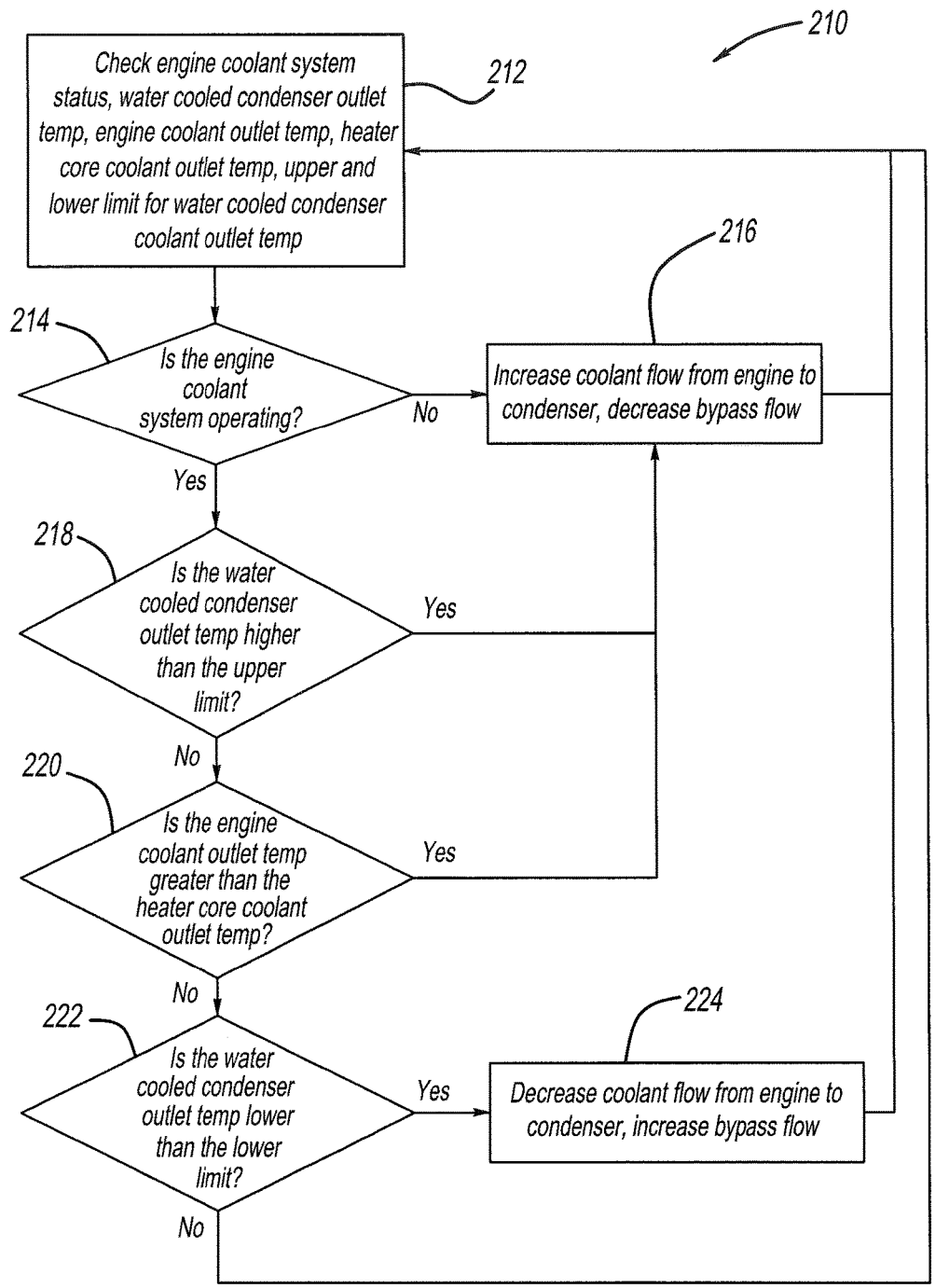
FIG. 8 is a flowchart of an exemplary method according to the present teachings for operating an HVAC assembly.

FIG. 8 illustrates a method of operating a suitable HVAC assembly or system, such as, but not limited to, the HVAC system 10 described above and illustrated in FIGS. 1-7. The method 210 can start at block 212 where various status checks and temperature checks are made, such as with the controller 54, which can receive inputs from various components of the system 10 and from temperature sensors located at suitable positions throughout the system 10. For example, the system checks and temperature checks can include the following: vapor compression system status check; water-cooled condenser outlet coolant temperature check; engine water outlet temperature check; heater core water outlet temperature check; and/or upper and lower temperature limits of coolant flowing from the water-cooled condenser 44.

After the initial checks at block 212 are complete, the controller 54, for example, will assess whether the coolant system 20 is operating at block 214. If the vapor compression system is not operating, the controller 54 will proceed to block 216. At block 216 the controller 54 will increase coolant flow from the engine 38 to the water cooled condenser 44, and decrease flow of coolant through the engine bypass line 32.

The coolant flow set forth in block 216 can be accomplished in any suitable manner. For example, the controller 54 can send a signal to the first valve assembly 50 to actuate the actuation member 130 and move the valve block 134 to the actuated position of FIG. 2, which will block coolant from passing to the engine bypass line 32 through the outlet B. Actuating the valve block 134 as illustrated in FIG. 2 permits coolant flow in through the inlet A from the heater core 16 and out through the second outlet C to the engine 38.

If the second valve assembly 52 is used in place of the first valve assembly, the controller 54 can operate the heating element 158 in order to open the second thermostat valve 156 and close the first thermostat valve 154 to provide the configuration of FIG. 7, in which coolant from the engine bypass line 32 is blocked at inlet A'. Coolant is, however, allowed to enter the chamber 152 at the second inlet C' from the engine 38, and exit the chamber 152 to the water cooled condenser 44 and the heater core 16 through the outlet B'. If coolant from the engine 38 is warm enough, such as is often the case when the engine 38 is running, the coolant may be warm enough to heat the heater core 16 without having to operate the compressor 60, which conserves energy.

If at block 214 the controller 54 determines that the coolant system 20 is operating, the controller 54 proceeds to block 218. At block 218, the controller 54 determines whether temperature of coolant exiting the water-cooled condenser 44 is higher than a predetermined temperature limit, such as 80° C. If the temperature of the coolant exiting the water-cooled condenser 44 is higher than the predetermined limit, the controller proceeds to block 216 in order to increase coolant flow from the engine 38 to the water cooled condenser 44, and to decrease coolant flow through the engine bypass line 32. For example, in order to prevent the water-cooled condenser 44 from cooling to quickly, such as if coolant is directed thereto solely from the engine 38, a mixture of coolant from both the engine 38 and the heater core 16 can be provided. Such a coolant mixture can be provided in any suitable manner. For example, if the first valve assembly 50 is being used with the HVAC system 10, such a coolant mixture can be provided when the thermostat valve 116 opens in response to being contacted by coolant at the elevated temperature. Because the thermostat valve 116 automatically opens in response to contact with coolant having an increased temperature, such as above a predetermined temperature of 80° C., coolant from the heater core 16 will enter the first valve assembly 50 through the inlet A, will flow to the thermostat chamber 114 through the inlet 118, will exit the thermostat chamber 114 through the outlet 120, and will flow to the engine 38 through the second outlet C. Because the valve block 134 is in the unactuated position of FIG. 4, coolant will also be able to pass from the inlet A to the outlet B, thus also allowing coolant to flow from the heater core 16 to the engine bypass line 32. Prior to reaching the water-cooled condenser 44, the coolant from the engine bypass line 32 and the coolant cooled by the engine 38 will mix, thereby directing coolant to the water-cooled condenser 44 that is of a cooler temperature than coolant directly from the heater core 16, which will often be below the predetermined upper limit of, for example, 80° C., which will allow the water-cooled condenser 44 to operate optimally.

If the first valve assembly 50 is replaced with the second valve assembly 52, coolant having a temperature above the predetermined limit, such as 80° C. for example, will cause the first thermostat valve 154 to slightly close, thereby decreasing coolant flow to the water-cooled condenser 44 from the engine bypass line 32. As the first thermostat valve 154 slightly closes, the second thermostat valve 156 will slightly open, in order to permit flow of coolant in through the second inlet C' and out through the outlet B', and thus from the engine 38 to the water-cooled condenser 44. Prior to reaching the water-cooled condenser 44, coolant from the engine bypass line 32 and from the engine 38 will mix, thus typically reducing the temperature of the coolant to below the predetermined limit, such as below 80° C. The first and the second thermostat valves 154 and 156 can open and close in response to temperature of the coolant, in order to arrive at a coolant mixture having an optimal temperature.

If at block 218 the controller 54 determines that the temperature of coolant exiting the water-cooled condenser 44 is not higher than the predetermined limit, such as 80° C., the controller proceeds to block 220. At block 220, the controller determines whether temperature of coolant exiting the engine 38 is greater than the temperature of coolant exiting the heater core 16, such as by receiving inputs from suitable temperature sensors located about the HVAC system 10. If the temperature of coolant exiting the engine 38 is greater than the temperature of coolant exiting the heater core 16, the controller 54 will proceed to block 216 and increase coolant flow from the engine 38 to the water cooled condenser 44 and the heater core 16, and decrease coolant flow through the engine bypass line 32. Such coolant flow can be provided in any suitable manner, such as by actuating the actuation member 130 of the first valve assembly 50 when the first valve assembly 50 is used in order to move the valve block 134 to the actuated position of FIG. 2 and permit coolant flow from the engine 38 to the water coolant condenser 44 and block coolant flow from passing through the engine bypass line 32. If the second valve assembly 52 is used in place of the first valve assembly 50, such coolant flow can be provided by, for example, activating the heating element 158 by sending a signal thereto from the controller 54 in order to provide the second valve assembly 52 with the configuration of FIG. 7, which permits coolant flow from the engine 38 to the water-cooled condenser 44, and restricts coolant flow from the engine bypass line 32 to the water-cooled condenser 44. Thus in situations where the coolant from the engine 38 is warmer than coolant exiting the heater core 16, coolant from the engine 38 can be used to heat the heater core 16, which may eliminate any need for the compressor 60 to be activated, thereby conserving energy.

If at block 220 a controller 54 determines that temperature of coolant exiting the engine 38 is not greater than the temperature of coolant exiting the heater core 16, the controller proceeds to block 222 and determines whether coolant exiting the water-cooled condensers 44 is less than a predetermined temperature threshold, such as 80° C. This temperature measurement can be based on, for example, inputs to the controller 54 from any suitable temperature measuring device, such as temperature sensors located at an outlet of the water-cooled condenser 44 along the heater core return line 34. If the controller 54 determines that the temperature of the coolant exiting the water-cooled condenser 44 is less than the predetermined threshold, the controller 54 will proceed to block 224. At block 224, the controller 54 will decrease coolant flow from the engine 38 to the water cooled condenser 44, and increase coolant flow through the engine bypass line 32. Such coolant flow can be provided in any suitable manner. For example, and in applications including the first valve assembly, the controller 54 can maintain the valve block 134 in the position of FIG. 3 so as to allow coolant from the heater core 16 to flow into the main chamber 112 through the inlet A and out to the engine bypass line 32 through the first outlet B. Because the second outlet C to the engine 38 is blocked by the valve block 134, coolant will not flow to the engine 38. If the second valve assembly 52 is used in place of the first valve assembly 50, the first thermostat valve 154 can open to permit coolant flow from the engine bypass line 32 to the water cooled condenser 44 and the heater core 16 through the first inlet A' and the outlet B', and the second thermostat valve 156 can close to restrict coolant flow from passing to the heater core 16 from the engine 38, as illustrated in FIG. 5.

If the controller 54 determines at block 222 that the temperature of coolant exiting the water-cooled condenser 44 is not lower than the predetermined lower limit, then the controller 54 returns to block 212, where the controller 54 again monitors the various temperatures and operating parameters of the HVAC system 10 listed at block 212. The controller 54 can be configured to run or perform the logic steps set forth in the method 210 of FIG. 8 at any suitable time interval, such as once every second.

Figure 9:
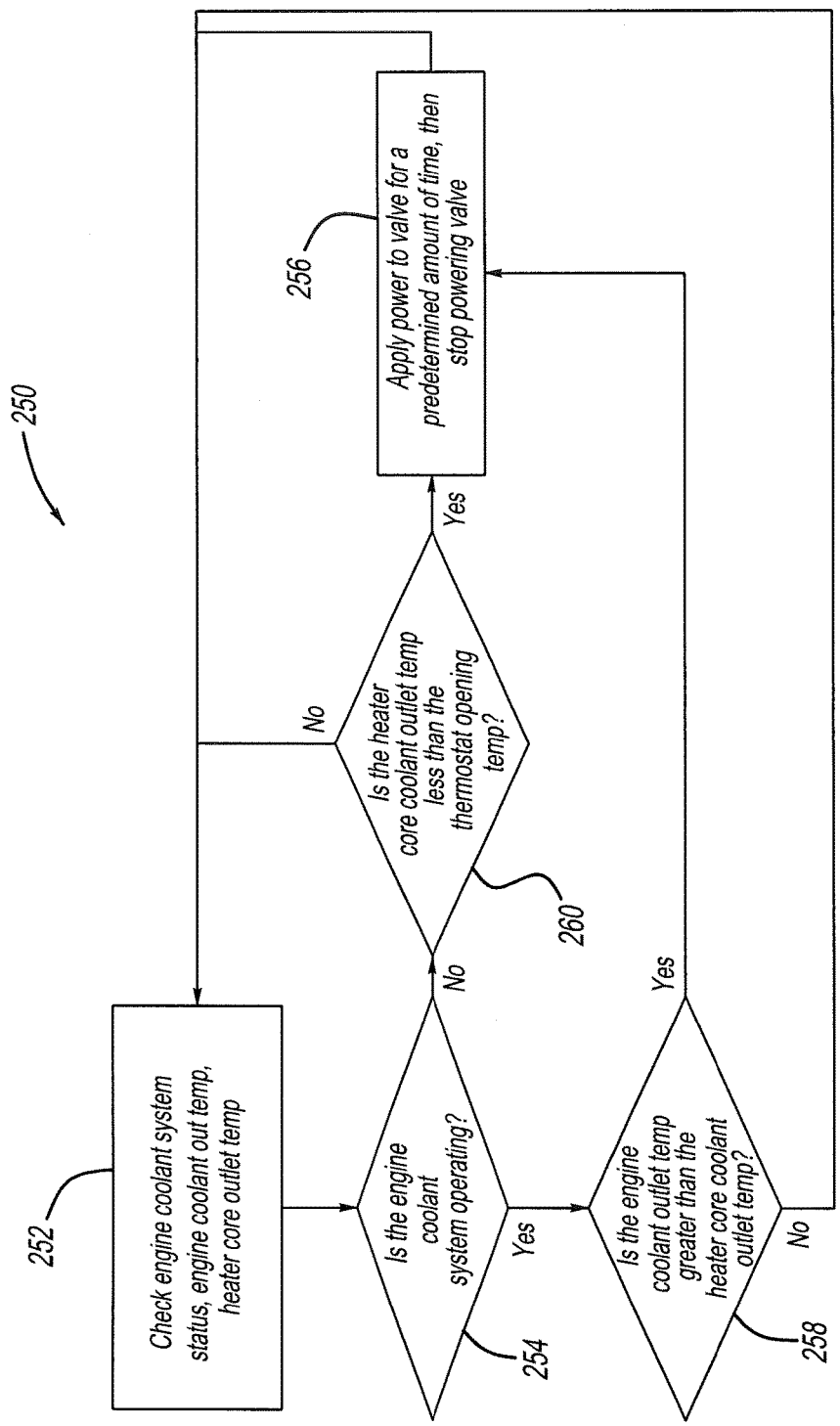
FIG. 9 is a flowchart of another method according to the present teachings for operating an HVAC assembly.

With reference to FIG. 9, another method 250 for operating an HVAC system, such as the HVAC system 10 for example, is illustrated at reference numeral 250. At block 252, the controller 54 checks various operational parameters of the HVAC system 10 and coolant temperatures of the engine coolant system 20, such as those of block 212 set forth above. From block 252, the controller 54 proceeds to block 254 where the controller 54 determines whether the coolant system 20 is operating. If at block 254 the controller 54 determines that the coolant system 20 is not operating, the controller 54 proceeds to block 260. At block 260 the controller 54 determines whether the heater core coolant outlet temperature is less than the thermostat opening temperature. If the heater core coolant outlet temperature is not less than the thermostat opening temperature, then the controller returns to block 252. If the heater core coolant outlet temperature is less than the thermostat opening temperature, then the controller proceeds to block 256.

At block 256, the controller 54 will apply power to the first valve assembly 50, or the second valve assembly 52 if the second valve assembly 52 is used in place of the first valve assembly 50. If the first valve assembly 50 is used, the controller 54 will apply power thereto in order to actuate the actuation member 130 and move the valve block 134 to the actuated position of FIG. 2. Power is applied for a predetermined amount of time. In the actuated position of FIG. 2, the first valve assembly 50 permits coolant flow from the heater core 16 to the engine 38 by allowing coolant to flow into the main chamber 112 through the inlet A, and out of the main chamber 112 through the second outlet C. If the second valve assembly 52 is used, the controller 54 will apply power to the second valve assembly 52 in order to heat the heating element 158 and move the second thermostat valve 156 to the fully open position of FIG. 7, thus allowing coolant to flow from the engine 38 to the heater core 16. The first thermostat valve 154 will be in the closed position of FIG. 7, thereby restricting coolant flow from the engine bypass line 32 to the heater core 16.

Figure 10:
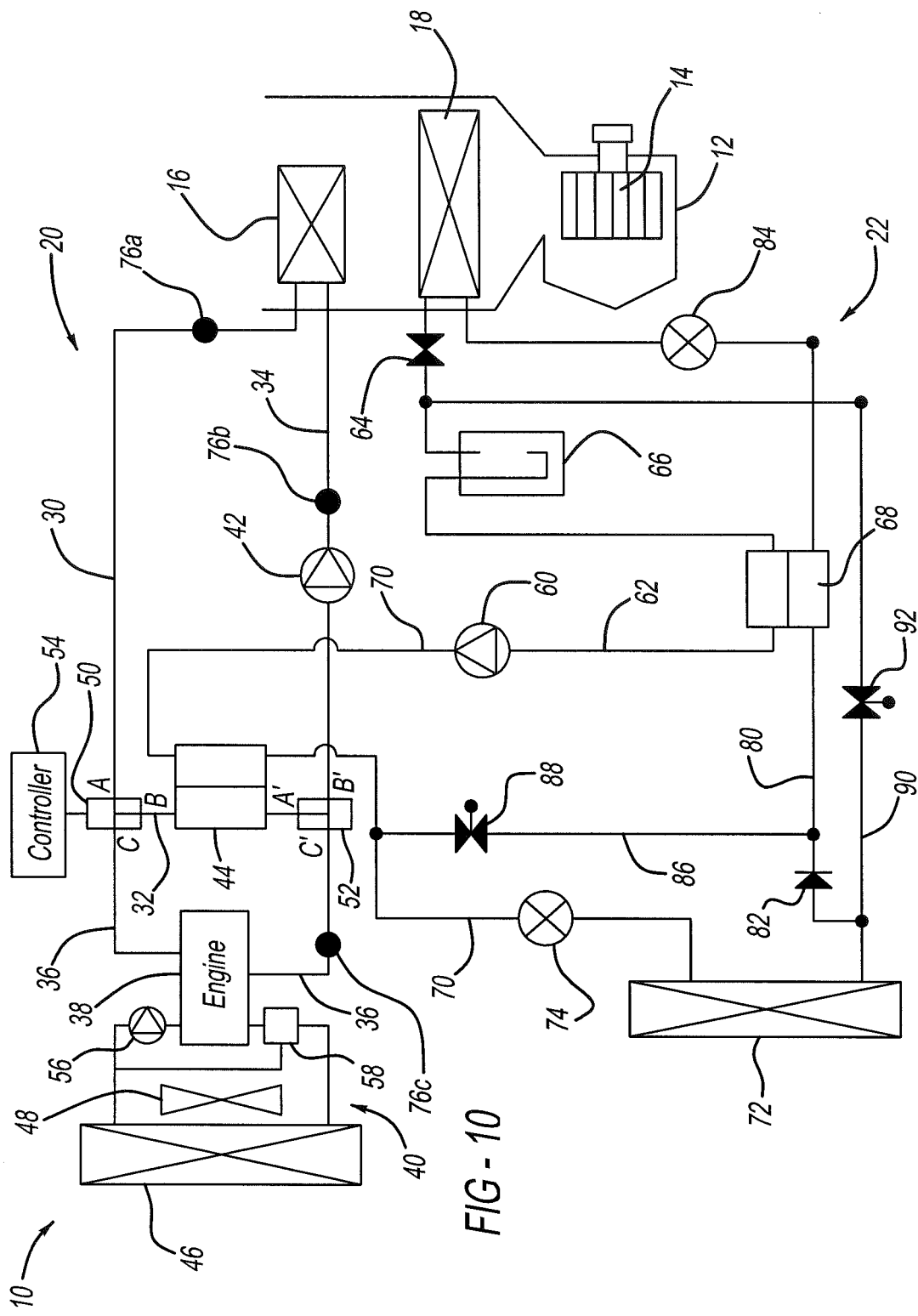
FIGS. 10-13 are schematic views of additional heating, ventilation, and air conditioning (HVAC) assemblies or systems according to the present teachings.
Figure 11:
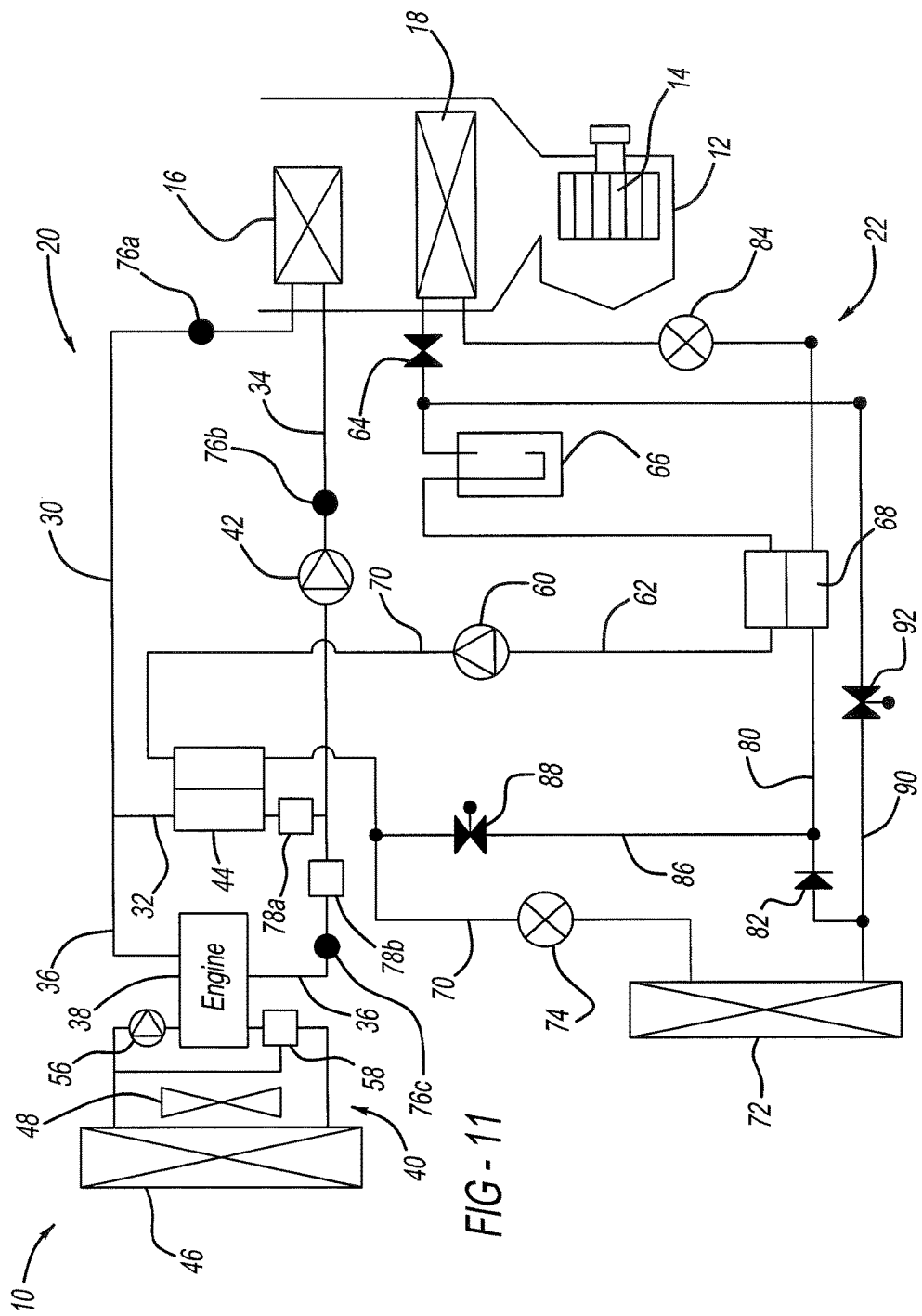

The heating, ventilation, and air conditioning (HVAC) assembly or system 10 illustrated in FIG. 1 can be modified in any suitable manner, such as depending on performance requirements. For example, and with reference to FIG. 10, the water cooled condenser 44 can be positioned along the engine bypass line 32. As explained above, either the first valve assembly 50 or the second valve assembly 52 can be included at the positions illustrated in FIG. 10. Alternatively, the second valve assembly 52 can be positioned where the first valve assembly 50 is illustrated, or the first valve assembly 50 can be positioned where the second valve assembly 52 is illustrated. The first and the second valve assemblies 50 and 52 are each optional, and can be replaced with one or more suitable valves. For example and with reference to FIG. 11, valves 78a and 78b can be used. The valves 78a and 78b can be any suitable valve, and can be the same type of valve or different types of valves. For example, the valves 78a and 78b can be single poppet thermostat valves.

Figure 12:
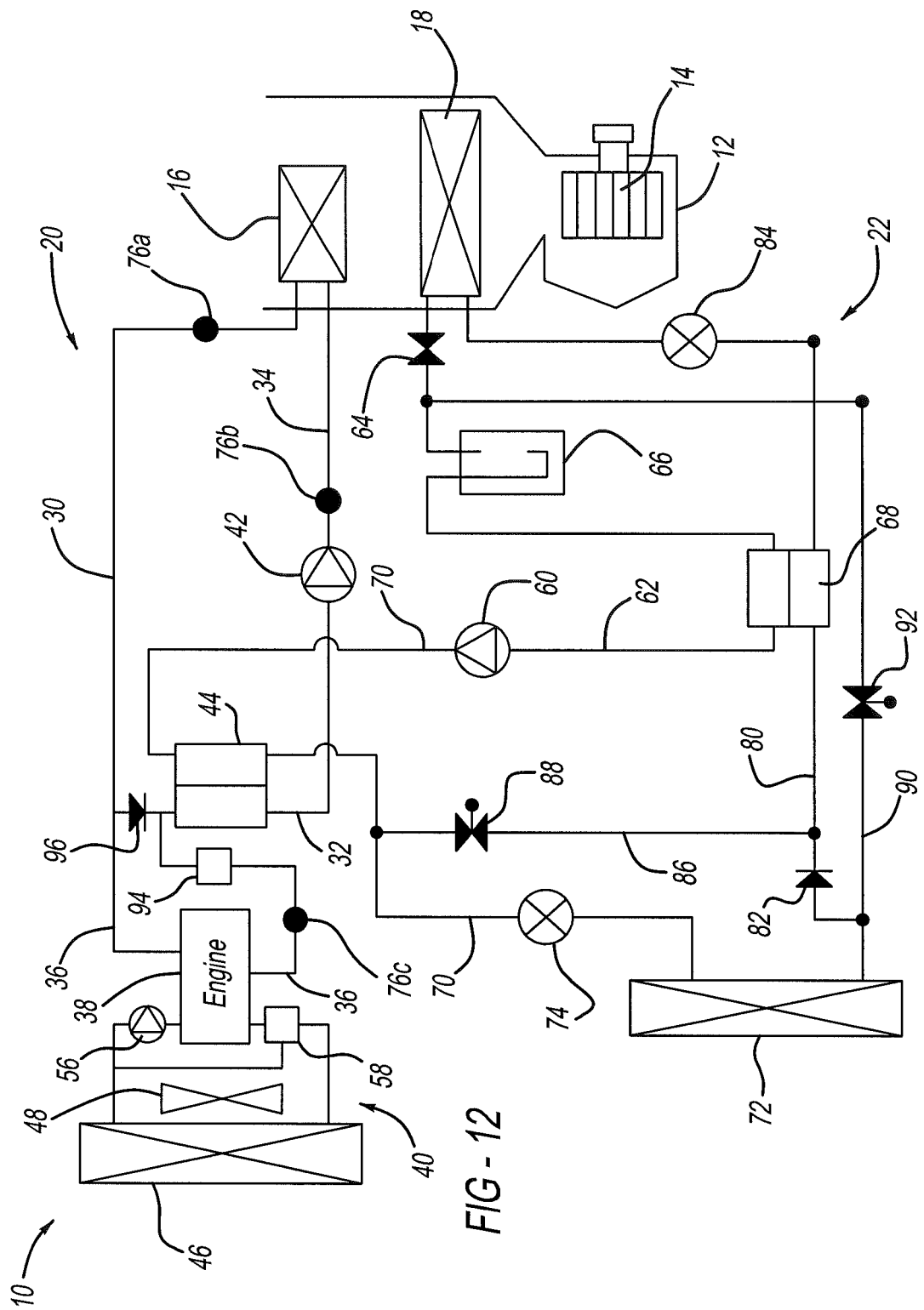
Figure 13:
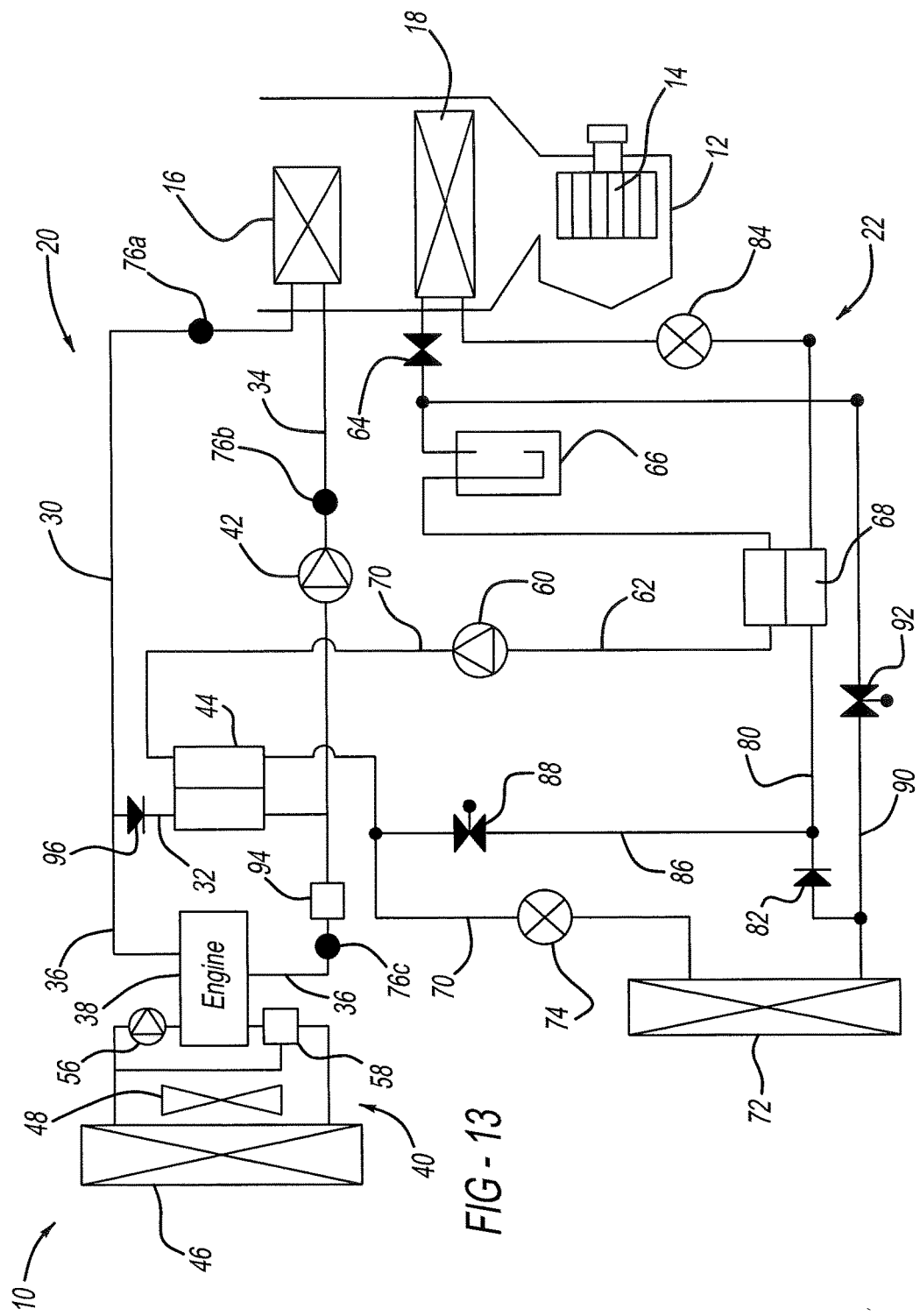

With reference to FIG. 12, another possible modification to the HVAC assembly or system 10 of FIG. 1 is illustrated. The configuration of FIG. 12 is similar to that of FIG. 11, but a single valve 94 is between the engine 38 and the water cooled condenser 44, and a valve 96 is upstream of the water cooled condenser 44 as illustrated in FIG. 12. The valves 94 and 96 can be any suitable valves. For example, the valve 94 can be a single poppet thermostat valve and the valve 96 can be a check valve, such as a one-way check valve having a pressure drop matched to that of coolant flow through the engine 38. In the configuration of FIG. 12, no controller or power source is necessary. FIG. 12 illustrates coolant flow from the engine 38 to a point on the engine bypass line 32 between the valve 96 and the water cooled condenser 44. But coolant flow from the engine 38 may alternatively be directed to a point on the engine bypass line 32 on an opposite side of the condenser 44, as illustrated in FIG. 13.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for regulating coolant temperature of an HVAC heat pump system with coolant heating to allow optimal operation of the HVAC heat pump system, comprising:
   increasing coolant flow from an engine to a heater core and decreasing coolant flow through an engine bypass line of the system if temperature of coolant exiting a condenser associated with the system is above a first predetermined threshold, to heat the coolant the condenser radiates heat from compressed refrigerant flowing through a heat pump refrigerant loop in fluid communication with an evaporator;
   increasing coolant flow from the engine to the heater core and decreasing coolant flow through the engine bypass line if temperature of coolant exiting the engine is greater than temperature of coolant exiting the heater core; and
   decreasing coolant flow from the engine to the heater core and increasing coolant flow through the engine bypass line if temperature of coolant exiting the condenser is below a second predetermined threshold.

2. The method of claim 1, further comprising maintaining an amount of coolant flow from the engine to the heater core and maintaining an amount of coolant flow through the engine bypass line when temperature of coolant exiting the condenser is not above the first predetermined threshold, when temperature of coolant exiting the engine is not greater than temperature of coolant exiting the heater core, and when temperature of coolant exiting the condenser is not below the second predetermined threshold.

3. The method of claim 1, further comprising increasing coolant flow from the engine to the heater core and decreasing coolant flow through the engine bypass line if the system is not operating.

4. The method of claim 1, further comprising providing coolant flow through the system with a pump.

5. The method of claim 1, wherein the coolant includes water and at least one of propylene glycol and ethylene glycol.

6. The method of claim 1, further comprising monitoring the following: operating status of the system; temperature of coolant exiting the condenser; temperature of coolant exiting the engine; temperature of coolant exiting the heater core; and upper and lower temperature limits of the water cooled condenser.

7. The method of claim 6, further comprising performing the monitoring at least partially with a controller.

8. The method of claim 6, further comprising actuating a valve of a valve assembly along a coolant line between the heater core and the engine to increase coolant flow from the engine to the heater core and decrease coolant flow through the engine bypass line.

9. The method of claim 6, further comprising actuating a valve of a valve assembly along a coolant line between the engine and a pump of the coolant line to increase coolant flow from the engine to the heater core and decrease coolant flow through the engine bypass line.

10. The method of claim 1, further comprising increasing coolant flow from the engine to the heater core and decreasing coolant flow through the engine bypass line if temperature of coolant exiting the engine is greater than temperature of coolant exiting the heater core by activating an actuation member of a valve assembly of the system.

11. A method for regulating coolant temperature of an HVAC heat pump system with coolant heating to allow optimal operation of the HVAC heat pump system, comprising:
    measuring temperature of coolant exiting an engine and measuring temperature of coolant exiting a heater core, the coolant flowing through the system and a condenser associated with the system, to heat the coolant the condenser radiates heat from compressed refrigerant flowing through a heat pump refrigerant loop in fluid communication with an evaporator;
    comparing temperature of the coolant exiting the engine with temperature of the coolant exiting the heater core; and
    if the temperature of the coolant exiting the engine is greater than the temperature of the coolant exiting the heater core, applying power to a valve of the system to configure the valve to direct coolant from the engine to the heater core and restrict coolant flow to the heater core through an engine bypass line.

12. The method of claim 11, further comprising applying power to the valve only when the engine is running.

13. The method of claim 11, further comprising applying power to a heating element of the valve to open the valve and permit coolant flow therethrough from the engine.

* * * * *